(12) United States Patent
Bay et al.

(10) Patent No.: US 7,490,272 B2
(45) Date of Patent: Feb. 10, 2009

(54) METHOD FOR VALIDATING THE PROPER OPERATION OF A TRANSACTIONAL MANAGEMENT SYSTEM

(75) Inventors: Douglas M. Bay, Broomfield, CO (US); Gene A. Brothers, Broomfield, CO (US); Wade D. Carson, Denver, CO (US); Gregory M. Gould, Denver, CO (US); Eric W. Grace, Superior, CO (US); Rajasekar Joseph, Denver, CO (US); Kenneth J. O'Brien, Louisville, CO (US); Daniel C. Seats, Golden, CO (US)

(73) Assignee: OXLO Systems, Broomfield, CO (US)

( * ) Notice: Subject to any disclaimer, the term of this patent is extended or adjusted under 35 U.S.C. 154(b) by 448 days.

(21) Appl. No.: 11/448,306

(22) Filed: Jun. 7, 2006

(65) Prior Publication Data

US 2008/0010561 A1    Jan. 10, 2008

(51) Int. Cl.
*G06F 11/00* (2006.01)
(52) U.S. Cl. .................................... 714/49
(58) Field of Classification Search ............ 714/47, 714/49, 50, 57, 15, 16, 18, 37–39
See application file for complete search history.

(56) References Cited

U.S. PATENT DOCUMENTS

| 5,916,307 | A  | * | 6/1999 | Piskiel et al. ............... 719/314 |
| 6,314,519 | B1 | * | 11/2001 | Davis et al. .................... 726/4 |
| 6,615,230 | B2 | * | 9/2003 | Nishimura ................... 718/101 |
| 2003/0046289 | A1 | * | 3/2003 | Balasubramanian et al. .. 707/10 |
| 2003/0065623 | A1 | * | 4/2003 | Corneil et al. ................ 705/64 |
| 2005/0015619 | A1 | * | 1/2005 | Lee ............................ 713/201 |
| 2005/0203994 | A1 | * | 9/2005 | Palmer et al. ............... 709/203 |

\* cited by examiner

*Primary Examiner*—Nadeem Iqbal
(74) *Attorney, Agent, or Firm*—Robert Schuler

(57) ABSTRACT

A transactional management system includes a plurality of functional modules, distributed in a WAN, for receiving and processing transactional information. The functional modules can include a dealer management system that receives transactional information and formats the information into a regular or test message for transmission over the WAN to either a router or a transaction service system which receives the message, performs certain service operations on the information contained in the message, and transmits the message to a provider management system. The transaction service system includes functionality that identifies a message as a test message, compares the test message to a test case, and if the test message is the same as the test case, generates a message to this effect.

16 Claims, 8 Drawing Sheets

Validation Process

Validation Process

US 7,490,272 B2

METHOD FOR VALIDATING THE PROPER OPERATION OF A TRANSACTIONAL MANAGEMENT SYSTEM

FIELD OF THE INVENTION

This invention relates generally to the field of distributed business applications running in a WAN environment and specifically to the area of verifying that any new distributed application modules added to a transactional processing system are integrated with the system correctly.

BACKGROUND

Transactional processing systems typically are composed of a number of processing modules or applications which provide specific functionality and are generally distributed geographically and in communication with one another over some network, either a LAN or a WAN. As long as these applications are homogenous, that is that they have been designed by a single vendor or have been designed to a single communications standard, or designed such that the data that is entered into the system is formatted in a manner that permits other modules in the distributed system to readily process the transactional information, there are typically very few integration issues associated with the system. As often happens, these systems are designed with a particular number of modules to provide a particular set of functions. Over time, other application modules become available that could be added to the system that would extend the systems functionality and provide for a more robust transactional processing system. These additional application modules may or may not be designed by the original systems developer or vendor and so may or may not plug into the existing system without some level of engineering effort or integration. This integration effort is typically performed by an integration engineer with the help of an integration consultant. This cooperative effort is time consuming for both the integration engineer and the consultant supporting the integration.

It would be advantageous if this integration process could be conducted by the integration engineer without the time consuming cooperation of the integration consultant that is typically necessary to perform such integration. It would be advantageous if at the end of the integration process, the integration engineer was assured that the integration process was performed correctly, such that all transactions that are created and placed into the system are processed as they are expected to be processed.

We have solved the above problem associated with the process of integrating one or more new application modules into an existing transactional management system. Specifically, we have developed an integration process that requires little to no integration consultation support be provided to the integration engineer, and which results in the integration engineer having a high degree of confidence that the new application module has been correctly integrated into an existing transactional management system.

SUMMARY OF INVENTION

We have invented a method for validating the integration of a first transaction processing module and a third transaction processing module that is comprised of the steps of entering predetermined transactional information into the first transaction processing module, creating a message and transmitting the message to a second transaction processing module which transmits the message to a third transaction processing module which receives the message, identifies the messages as a test message, determines which of a plurality of test cases the test message corresponds to compares at least one test message characteristic with at least one corresponding test case characteristic, and as the result of the comparison generates a message that contains an indication of the successful integration of the first and third transaction processing modules.

Alternatively, we have invented method for validating the integration of two transaction processing modules that is comprised of the steps of entering predetermined transactional information into a first transaction processing module, creating a message and transmitting the message to a second transaction processing module which receives the message, identifies the messages as a test message, determines which of a plurality of test cases the test message corresponds to compares at least one test message characteristic with at least one corresponding test case characteristic, and as the result of the comparison generates a message that contains an indication of the successful integration of the first and second transaction processing modules.

In another embodiment, we have invented a method for validating the integration of two or more transaction processing modules that is comprised of the steps of entering predetermined transactional information into a first transaction processing module, creating a message and transmitting the message to a second transaction processing module which receives the message, identifies the messages as a test message, determines which of a plurality of test cases the test message corresponds to compares at least one test message characteristic with at least one corresponding test case characteristic, as the result of the comparison generates a message that contains an indication of the successful integration of the first and second transaction processing modules, determines whether the test message requires a simulated response message, and if so generates a simulated response message and transmits it to the first transaction processing module.

DETAILED DESCRIPTION

Figure 1:
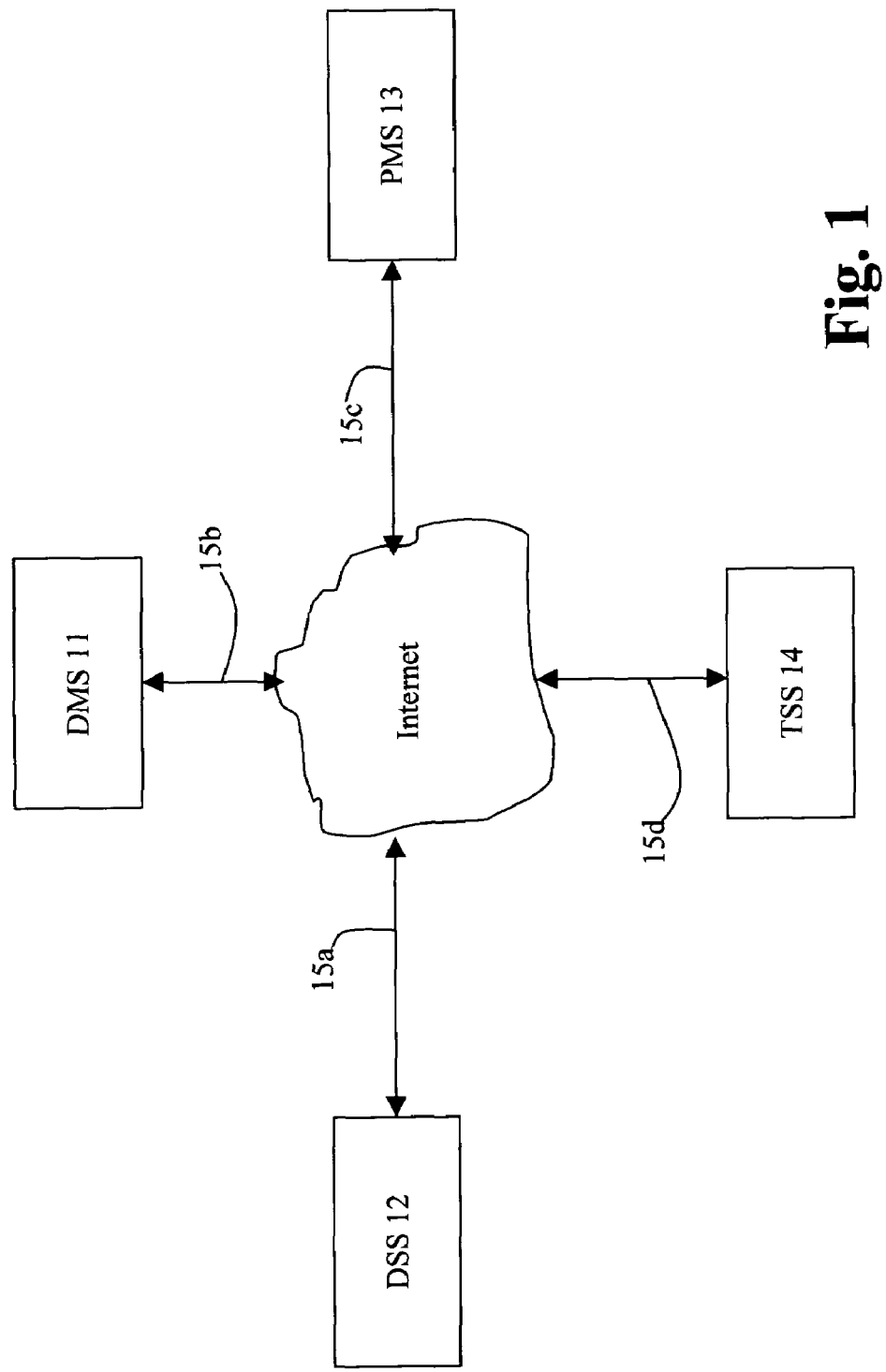
FIG. 1 is a high level block diagram showing the architecture of a transaction management system in which the preferred embodiment of our invention is implemented.

FIG. 1 is a high level block diagram showing the distribution of various components or modules of a transaction management system (TMS) 10 as they appear in a public WAN such as the Internet. While the preferred embodiment of our invention operates in a public network environment, it could also operate in a private network environment or a virtual network whether the network be a WAN or LAN. While the preferred embodiment of our invention operates in a system that manages transactions directed to the automotive industry, it could be easily modified to manage transactions in the financial industry or any other industry where one party orders a commodity and another party supplies the commodity. The TMS is shown as being composed of four distributed components or transaction processing modules, a dealer management system (DMS) 11, a dealer service system (DSS) 12, a provider management system (PMS) 13, and a transaction service system (TSS) 14 all of which communicate over a public WAN such as the Internet or over a private LAN using the standard Ethernet protocol using respective communication links 15*a*, 15*b*, 15*c*, and 15*d*. Generally, the DMS is comprised of at least one server and a number of clients that cooperate to receive transactional information, place the information into a message with a particular format and then transmit the message over the public network to the DSS 12. More specifically, the DMS client is typically a personal computer (PC) that provides the user, which could be an employee of an automobile dealership, with the means to enter transactional information into the system. This information includes, but is not limited to, such things as automobile sales orders, information relating to a parts order, information relating to a request for financing or information relating to a service request. The client PC shares application modules that reside on a server that are utilized by the PC to enter the transactional information. So, for instance, if the employee wishes to enter automotive sales information, they might select a sales application which when accessed presents the employee with a page formatted to receive specific sales transaction information, such as vehicle manufacturer, vehicle model, options, and so forth. Or if the employee wishes to order parts, they would select the parts application module and then enter a supplier identification number, the originator identification number, the transaction type, transaction number, and specific transaction information such as a part number, quantity, shipment priority, authorization code, etc. The application receives this transaction information, places it into a particular format that permits it to be easily processed by other distributed component parts of the TMS 10, such as the DSS 12, TSS 14 and PMS 13, and then typically transmits it over the public network to the DSS 12. Each of the dealer application modules are designed so that they are able to pass messages to and receive messages from other component TMS modules in a seamless manner. Typically, the dealer application module will be designed following certain rules or guidelines which permit this module to effectively communicate with other distributed TMS components. Although in theory, this should be a straight forward development exercise, in reality it is a complicated process that almost always results in an integration engineer receiving assistance from an integration consultant working for a second or third party who has knowledge of the design of other distributed TMS components working together to solve integration problems.

Figure 2:
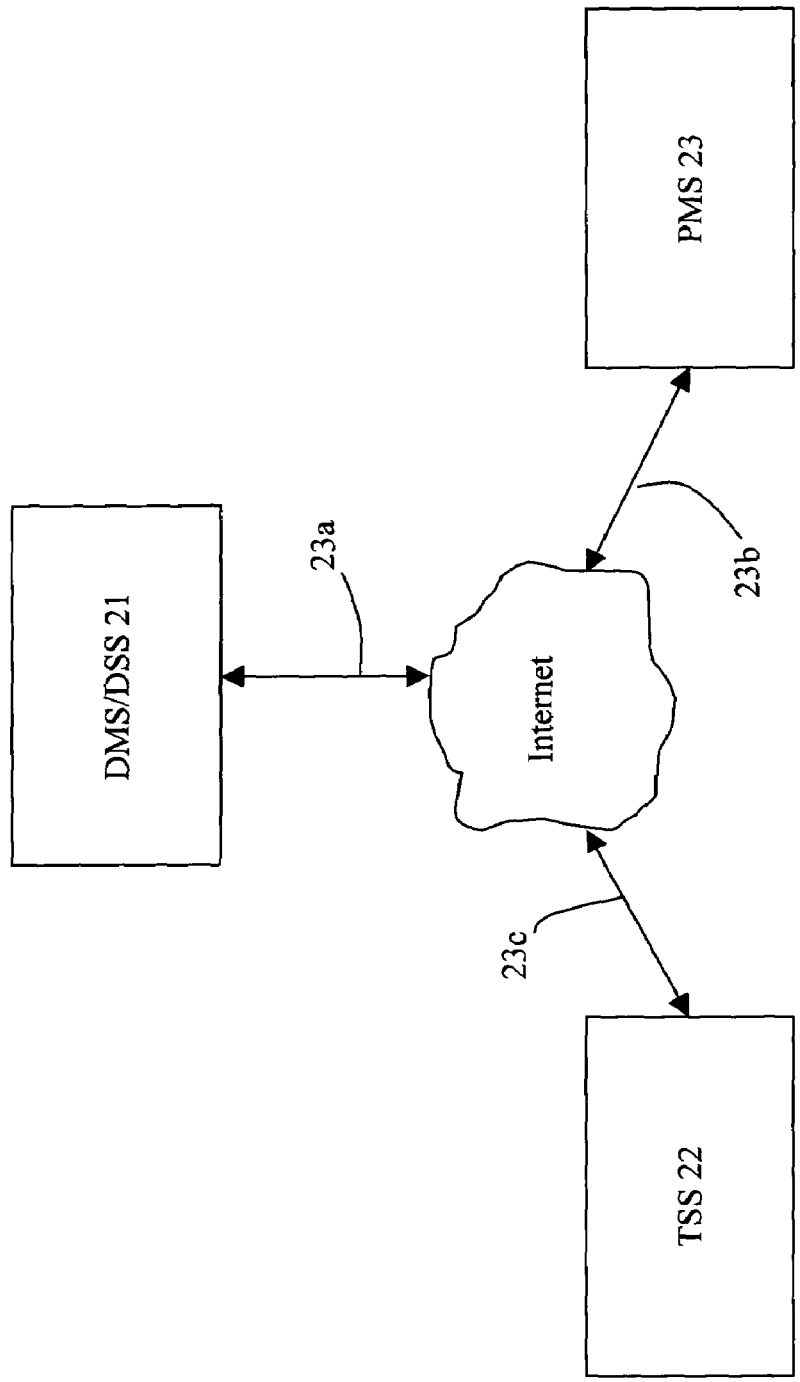
FIG. 2 is a high level block diagram showing the architecture for a transaction management system in which an alternative embodiment of our invention can be implemented.

Continuing to refer to FIG. 1, DSS 12 generally functions as the point of reception for messages originating from a DMS 11. The DSS may perform some level of processing, such as send a response to the dealer application that the message was received or not received, for instance, but for the purposes of this description, the DSS can be considered as simply a router that receives messages from the DMS and transmits them to the TSS 14 without modification or receives messages from the TSS and transmits them to the DMS without modification. TSS 14 generally operates to perform a number of transaction monitoring and management functions such as determining whether the received transaction message is valid or not, and if not sending a response to the DMS through the DSS ensuring that the TMS 10 does not process more than one message with the same information, monitoring the progress of the transaction throughout the system and reporting on its progress, sorting transactions according their destination and generally providing added value to the transactional process. Additionally, and in accordance with our invention, the TSS 14 is designed to provide automatic or self-service integration (SSI) support functionality which we will describe later in more detail with reference to FIG. 5, but generally SSI refers to providing an integration engineer, who may develop the DMS application modules, with information about an API and test messages created utilizing predetermined transaction information provided by an integration consultant, that they can enter into the DMS and receive responses from the TSS that are indicative of whether or not the test message could be processed by the TSS and generally verifies the overall integration of the dealer application module with the TSS. The TSS 14 also generally functions to transmit messages received from the DMS 11 via the DSS 12 to the PMS 13. PMS 13 receives the transaction information, processes it and presents the transaction information, which is typically a request for some sort of service as mentioned previously, to a person in an easily understood format such that the request can be fulfilled. Typically, the PMS will respond by indicating that the part or parts are in stock and can be delivered on a particular date or that a vehicle is available at the manufacturer and can be shipped to the dealer on a particular date, etc. This response message is then transmitted by the PMS to the TSS which in turn transmits the message to the DSS which in turn transmits the message back to the DMS 11. It should be understood, that although we described our invention in the context of a TMS that has four distributed components, the functionality incorporated into the DSS 12 and the TSS could be incorporated into either the DMS 11 or the PMS 13 or the DSS functionality could be incorporated into the DMS and the TSS functionality could be incorporated into the PMS. There are other combinations of functionality possible, but in practice, the location of any of this functionality is largely a business decision and not a technical one. FIG. 2 is an illustration of one alternative embodiments of a transactional management system architecture as described above with the DMS and DSS functionality residing in the same server or at least in the same proximate physical location.

Figure 3:
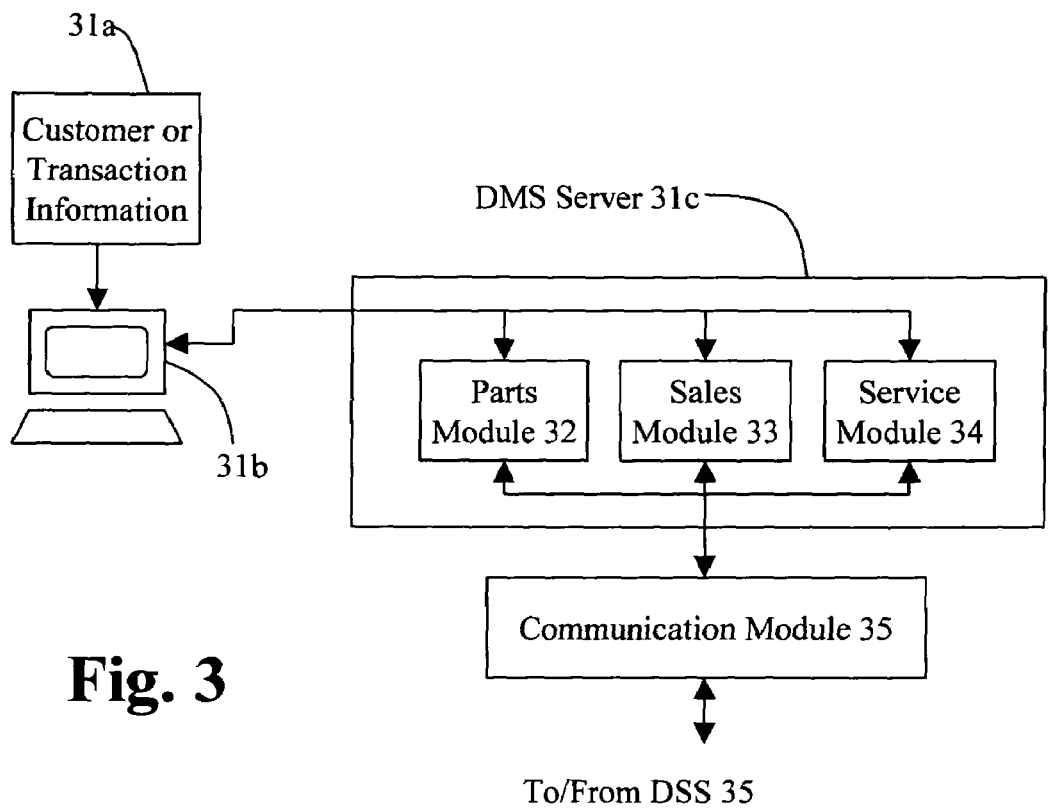
FIG. 3 is a high level block diagram of a dealer management system transaction management module.

Turning now to a discussion of FIG. 3 which is a block diagram illustrating the different types of dealer application modules and a communications module that could reside in the DMS 11 of FIG. 1. Generally, with reference to FIG. 3, transactional information 31*a* is entered into a client device 31*b*, which could be a PC, which has access to one or more application modules 32, 33, or 34 running on a DMS server 31*c*. Although we only identify three application modules for the purpose of this description, it should be understood that others could be included. As previously described with reference to FIG. 1, these application modules are designed according to certain rules or guidelines such that the application is able to receive transactional information, format this information into messages that are sent to other distributed TMS components, and such that the messages can be effectively and accurately processed by the other distributed TMS components, such as the DSS 12, the TSS 14, and/or the PMS 13. Specifically with respect to application module 32, for instance, it is important that this module is designed such that it places the transaction information received from the PC into a particular message format. In the preferred embodiment of the TMS, the application engineers design the application modules to transform the raw transactional information received from the PC into a message according to a particular messaging format or schema that is provided to the engineer. In the preferred embodiment of our invention, these messages are created in the XML language, but any messaging language can be used. More specifically with reference to the XML message, parts order information could be placed into the message such that certain fields are identified in a particular manner, such as "SenderID" or "DestinationID", the fields could be required to be placed in certain positions with respect to other fields in the message, and the fields might be required to be capable of receiving a certain number of characters, certain types of characters, or even specific sequences of numbers or characters. Subsequent to the application module receiving the raw transaction information and formatting it into an XML message, it is then passed to a communications module 35 where it is transmitted over the Internet, in this case, to another distributed TMS component. The communications module can be any sort of communications interface capable of taking a message in XML format, encapsulating it into HTTPS packet format, for instance, and then transmitting it to a destination address according to routing information contained in the message.

Figure 4:
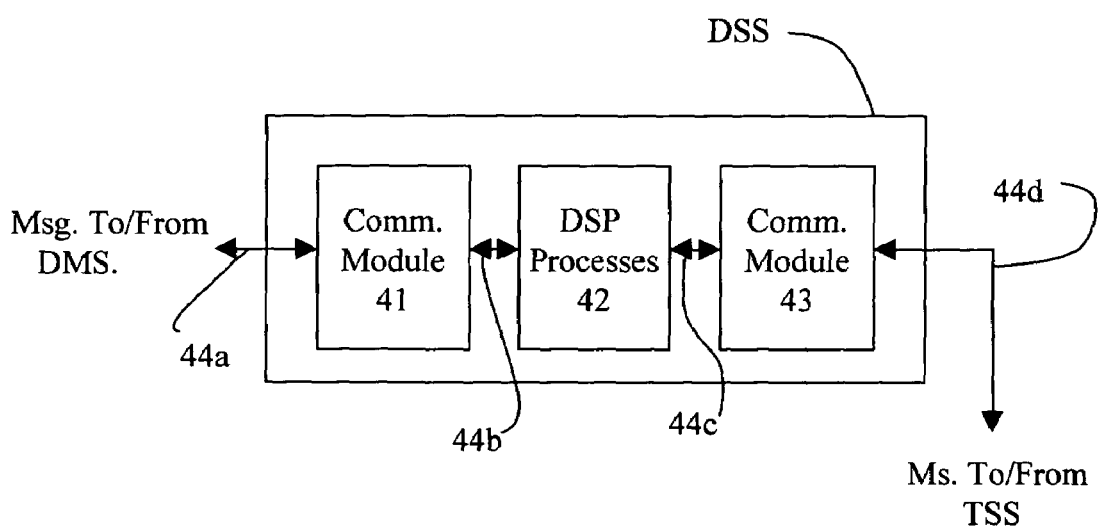
FIG. 4 is a high level block diagram of a dealer service provider transaction management module

FIG. 4 is a block diagram showing the various functional elements that reside at DSS 12 of FIG. 1. The DSS includes two communications modules 41 and 43 which are similar to the communications module described above with respect to FIG. 3 and which serve to both receive and transmit messages to other distributed TMS components. The DSS also includes various processes such as responding to messages originating at other distributed TMS components. But generally, as described earlier with reference to FIG. 1 and for the purposes of this description, the DSS can be thought of as merely a router, as the message processing that takes place here has no effect on the design of invention.

Figure 5:
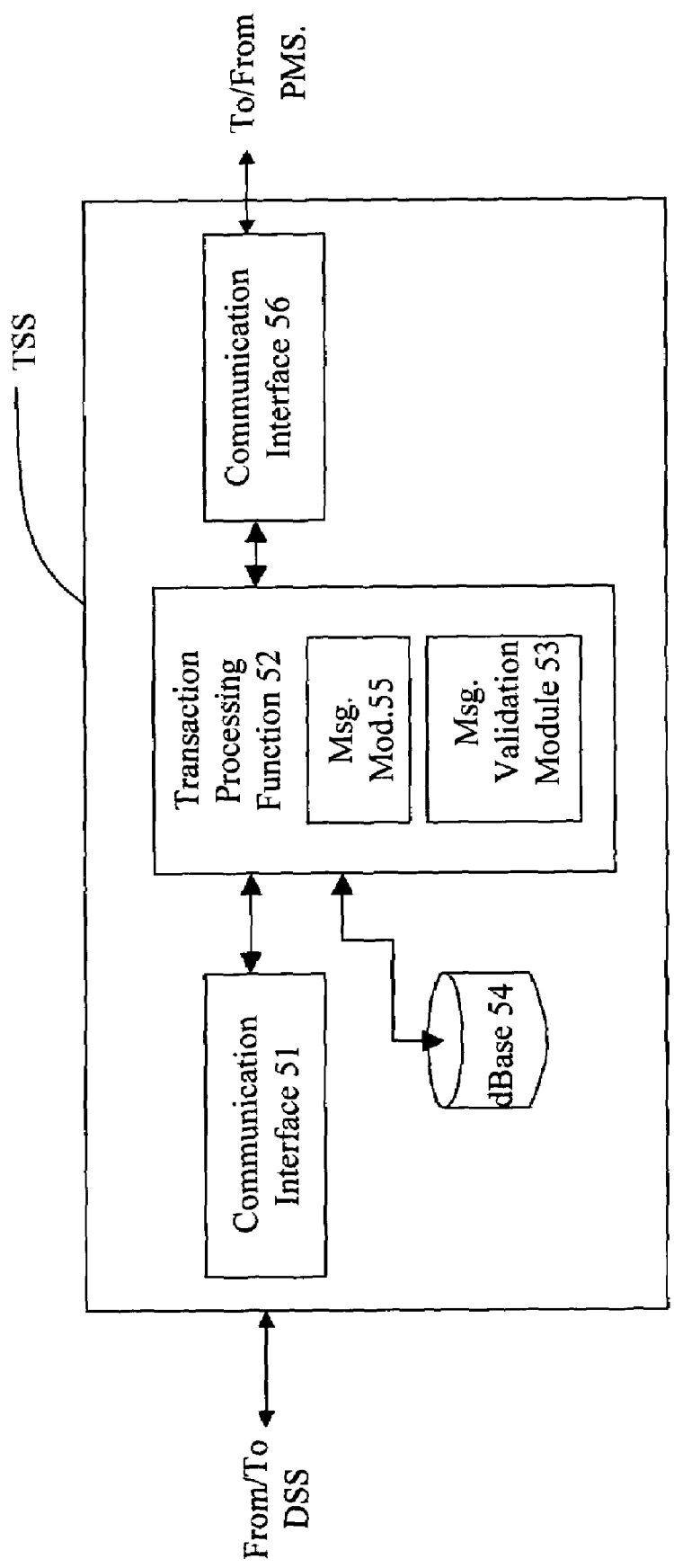
FIG. 5 is a high level block diagram of a transaction service module

FIG. 5 is a block diagram illustrating the functional elements of TSS 14 of FIG. 1. As previously mentioned, TSS 14 generally, and the transaction processing function (TPF) 52 specifically, operates to perform a number of transaction monitoring and management functions such as determining whether the received transaction message is valid or not and if not sending a response to the DMS, ensuring that the TMS 10 does not process more than one message with the same information, monitoring the progress of the transaction throughout the system and reporting on its progress, sorting transactions according their destination and generally providing added value to the transactional process. Additionally, the TPF 52 examines incoming messages to determine whether they are valid messages from a registered user/sender (someone with an ID no.), and that they are in proper XML format as previously mentioned and it generally functions to control the overall test message validation process which will be described later with reference to FIGS. 7a, 7b and 7c. The TPM functionality can be developed using any one of a number of commercially available transactional management system development tools such as WebSphere® JBOSS®, or BizTalk. Among other functions, the TPF also includes a messaging module function 55 to generate error messages, status messages, and messages that are used during a DMS certification and validation processes and it includes a message validation module 53 that is used to identify a message as a test message, to identify what type of test case the message corresponds to and to evaluate or compare the received test message against the message as it should have been received which is the corresponding test case. The TSS 14 also includes a store or dbase 54 of test suites and associated test cases. Each test suite typically corresponds to one or more test messages that are created that would otherwise be routed to a particular PMS 13 in FIG. 1. Each of the one or more test cases contains specific data arranged in a particular XML format that is expected if a particular type of test message is transmitted by the DMS 11. This could be a parts order test case #2 for instance. These test cases are used during the test message identification and validation processes which will be described below with reference to FIG. 6.

Figure 6:
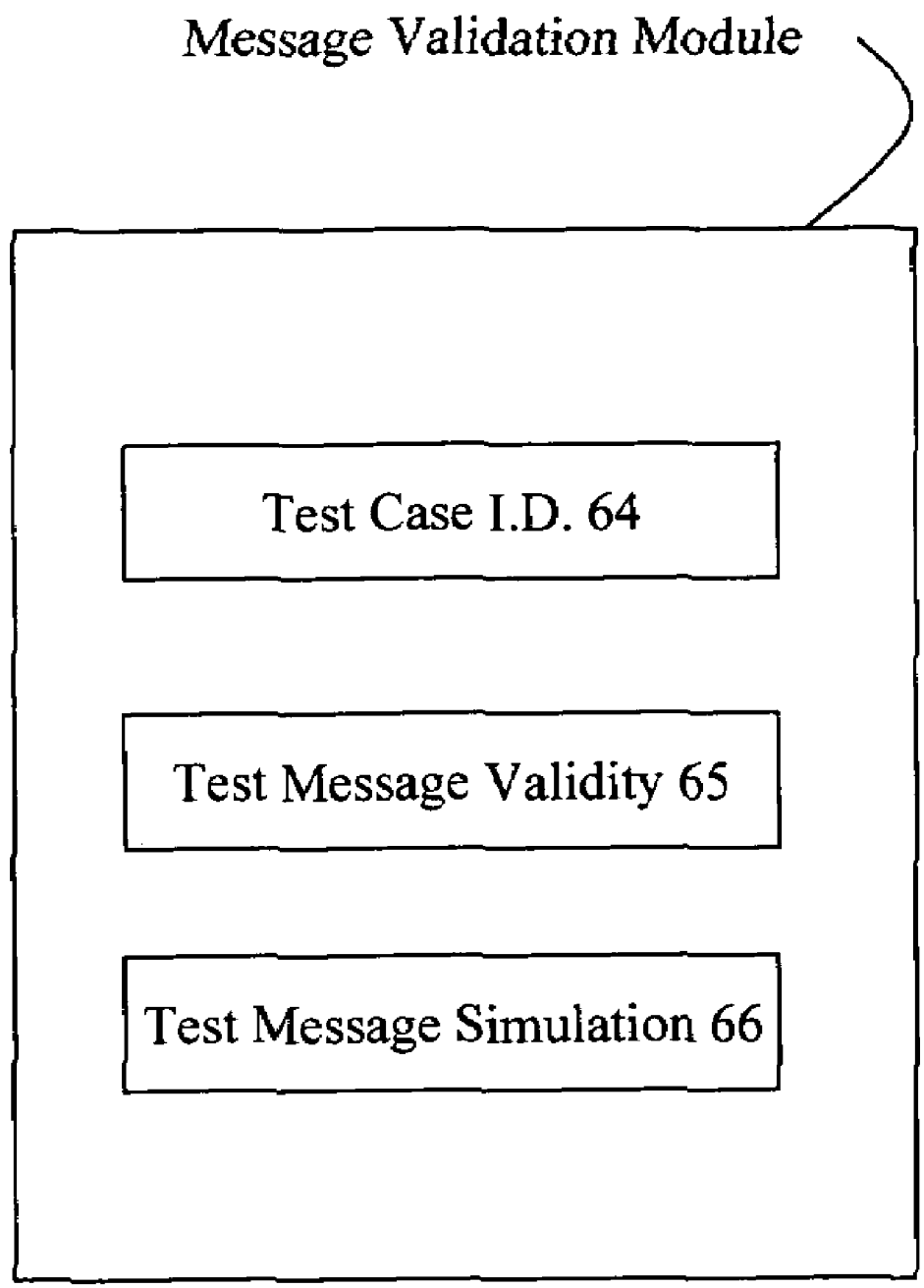
FIG. 6 is a block diagram showing a message validation module with three sub-modules.

FIG. 6 is a more detailed block diagram showing the functional elements of the message validation module 53 of FIG. 5. Specifically, validation module 53 includes a test case I.D. module 64, a test message validity module 65, and a test message simulation 66. The test message validation module 53 operates to identify a message as either a parts order, new vehicle order, service order, etc., it also operates to identify a message as a test message and identifies which test case number the message corresponds to, and it also operates to locate the test case file in dbase 54. The test case I.D. module examines each message received by the TSS for certain "key" data that identifies the message as a test message. For instance, a particular part number, X1234 for instance, located in the part number field of a part order message could identify a message as a test message. Once a message has been identified as a test message, the test message I.D. module 64 then uses the key data to search the dbase 54 looking for a corresponding test case. As mentioned previously, the test case represents a test case message corresponding to the received message containing the key data part number X1234. Once located, the test case message is temporarily loaded into memory associated with or mapped for use by the message validation module. The test message validity module 65 operates to compare some or all of the data and business rules in the received message to the corresponding test case message located by the test case I.D. module 64 in dbase 54 and placed into memory. The business rules mentioned above can include such things as dealer X can't order more than a certain number of parts from supplier Y. Other test messages can be validated using these or other criteria, but for the purposes of this description we are limiting the discussion to test case data and business rules. The data and business rules are compared, test message field for test case field, to confirm that the data is exactly the same or not. Alternatively, it may not be necessary to compare each test message field with each test case field to validate the integration process. Whether or not to compare all fields of some fields is made on a test case by test case basis. In the event that the data and the business rules contained in all of the fields of a received message matches all of the data in the test case file, file X1234 for instance, then the message module 55 of FIG. 5 sends a message confirming this to a web portal. The information contained in each field of a test message and a test case described above is referred to here as either a test message characteristic or a test case characteristic. The technique used to make such a field for field data comparison is well known in the art and so will not be described here in any detail.

Figure 7A:
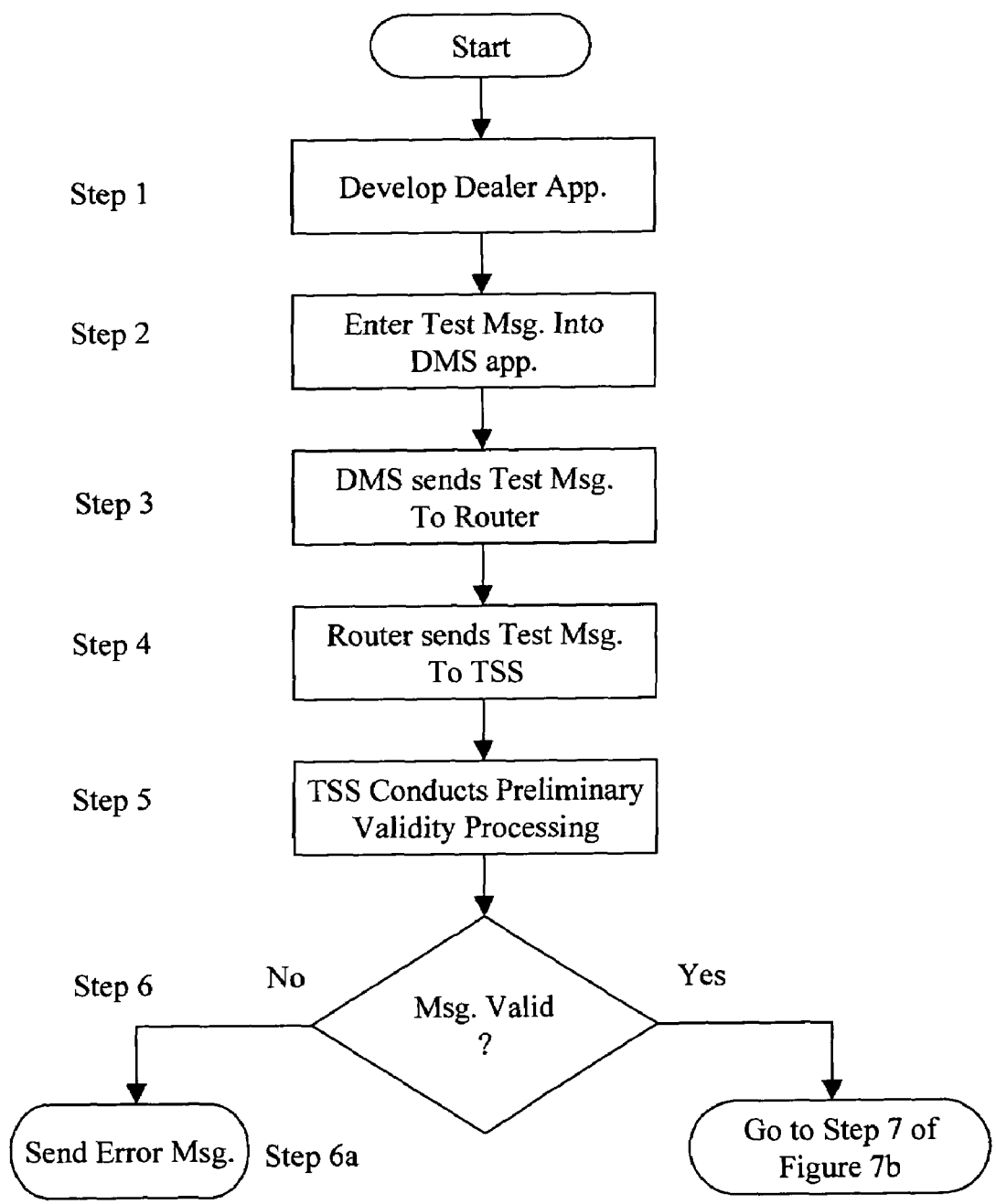
FIG. 7*a* is a logical flow diagram of a portion of the validation process of our invention.

Turning now to FIG. 7a, which is a logical flow diagram of the method of our inventive TMS verification design. At step 1 the applications engineer develops at least one dealer application module, such as the parts module 32 of FIG. 3, using information and guidelines received from an engineer familiar with the operation and design of TSS 14 of FIG. 1. In step 2, the integration engineer, for instance, enters predetermined test transactional information into a PC that has access to the dealer application on a server. As described previously, this can be simple data such as a part number, the number of parts ordered, the date on which the parts are needed by the dealer, or business rules such as a promotion codes or discount codes, or the maximum parts the dealer can order from the supplier, etc. This test information is provided by the integration consultant and is designed to identify certain types of bugs or problems with the design of the dealer applications module. Further, this test transactional information contains at least one "key" data element in a field or entry that the TSS uses to identify the message as a test message. At the point that the integration engineer enters the test transactional information into the PC, the PC sends it to the dealer application module where certain other information, such as dealer ID and destination ID are added and the information is converted into an message in a particular XML format, the XML formatted message is encapsulated in a packet and, in step 3, transmitted to the router or DSS 12 of FIG. 1. As previously discussed with reference to FIG. 4, the router has no effect on the operation of our invention and merely serves, in step 4, to direct the test message to its destination, which in this case is the TSS. In step 5, the TSS receives the message and conducts some initial validity checks, such as is the message from a registered user of the TMS, is the message in the correct XML format, is the message a valid parts order message or vehicle order message. Provided that message is a valid message, the process proceeds to step 7 of FIG. 7*b*, otherwise, one or more error messages are generated by the message module 55 of FIG. 5 and sends them to the originator of the message. Once it successfully sends the error message, the TPF listens for any other incoming message from DMS11 coming via DSS12.

Figure 7B:
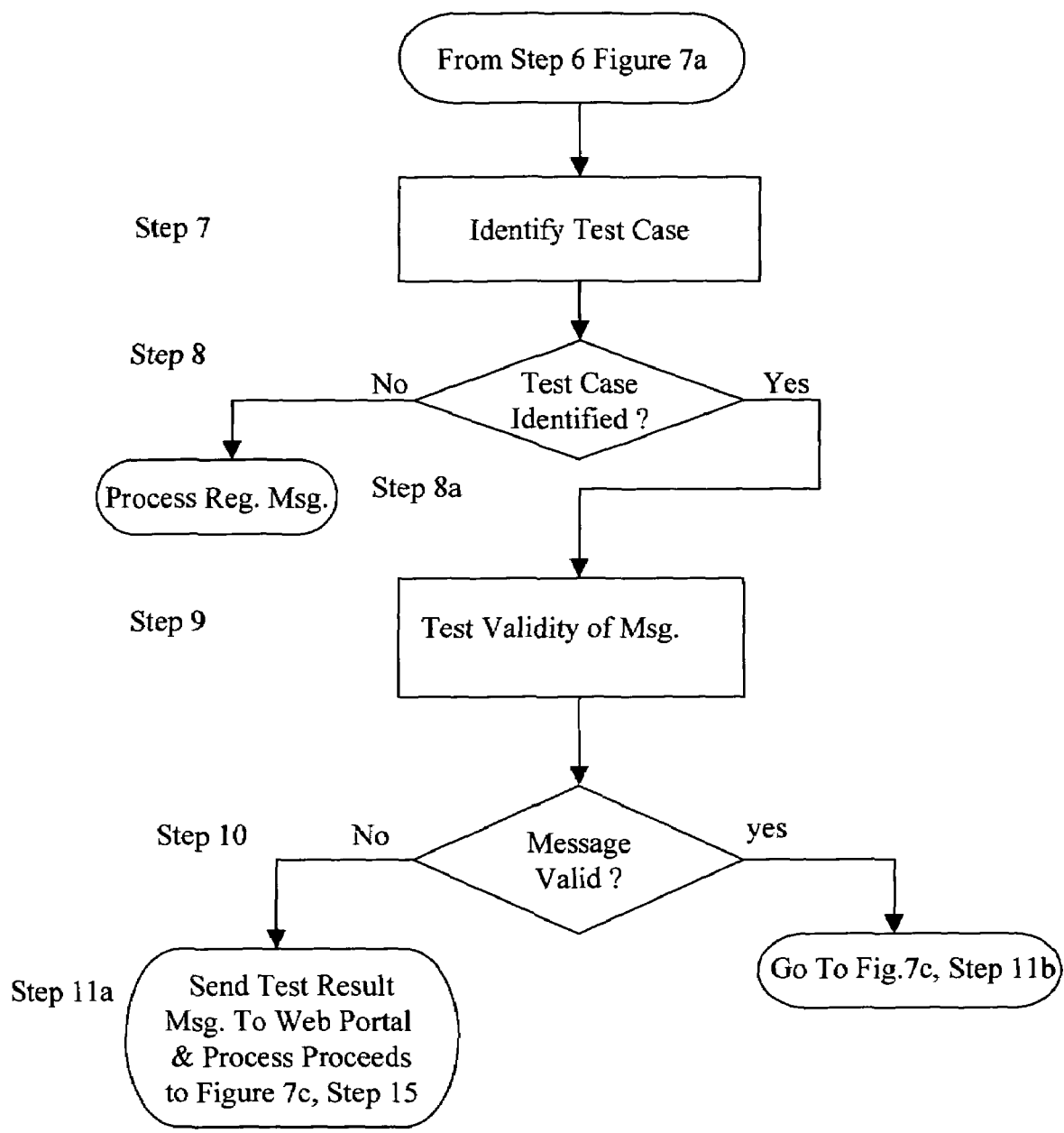
FIG. 7*b* is a logical flow diagram of a portion of the validation process of our invention.
Figure 7C:
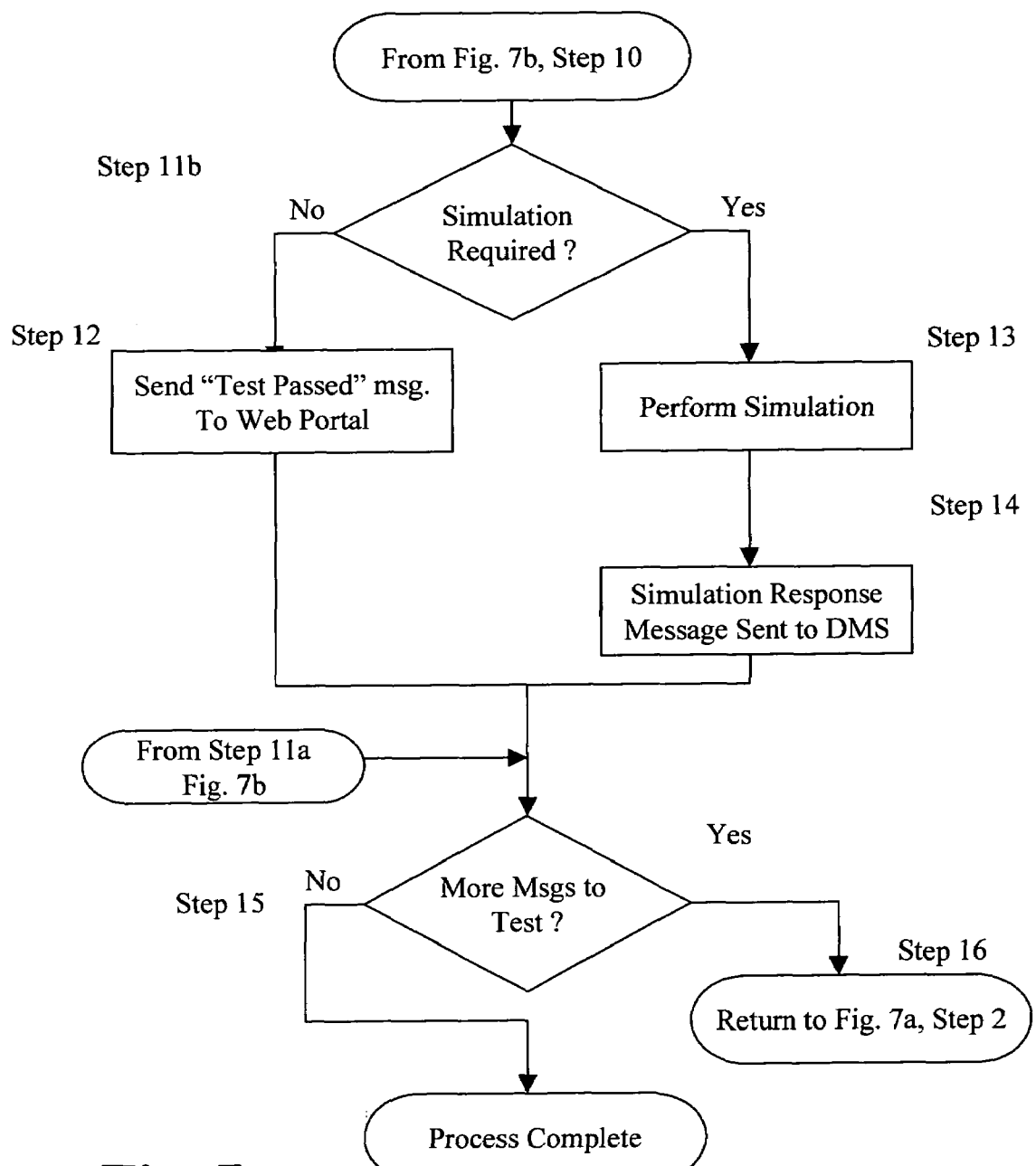
FIG. 7*c* is a logical flow diagram of a portion of the validation process of our invention.

Referring now to FIG. 7*b*, the verification process proceeds to step 7 in which step the message is identified as a test message or not. This test is performed by the test case I.D. module 64 of FIG. 6, by examining the message for "key" data that matches the same data contained in any particular test case file stored in dbase 54 of FIG. 5. If a match is found, then the message can be both identified as a test message and the particular test case can also be identified. However, if the test case identification module is not able to find any "key" data in the message, the TSS assumes that this message is a regular message, or a non-test message, and in step 8 proceeds to process the transaction message in a normal fashion, that is to say it is processed as a regular transaction message as was described previously with reference to FIG. 1. The message is identified to determine whether it is a parts order, a new vehicle order, a service request, etc. and if it is any other these it is also determined which test case the message corresponds to and it locates the test case in memory with a pointer to a particular memory location for instance. Assuming that the test case I.D. module identifies the message as a test message and it identifies the test case, then the verification process proceeds to step 9.

Continuing to refer to FIG. 7*b*, in step 9 the test message validity module 65 compares the data contents of the received message that has been identified as a test message and with the contents of the corresponding test case. As previously mentioned with reference to FIG. 6, this comparison is a line by line, field for field comparison of the test message characteristics to the corresponding test case characteristics. The respective overall formatting and organization of the two messages are compared, the construction of each program line is compared, the business rules content of the message and the data content of each field of the messages are compared. Some arguments or fields may be optional and some may be required. The information as to whether or not certain data or business rules are optional or required is carried in the body of the test message and in the test case message. A message, noting the differences between the two messages, makes allowance for this optional and required construction or content. We have included an exemplary test message and test case as examples 1 and examples 2 respectively below.

The test message example 1, below, shows the required "R" and optional "O" message fields to the left of the message. Some of the fields in the test message include data, such as the data "33" in the order no. field or the data "344.111" in the part number field and some of the fields include business rules, such as the discount code "Y" or the promotion code "Z". We refer to the data and business rules that populate the fields of a test message received by the TSS as received message characteristics.

EXAMPLE 1

Test Message

| R | <Start Process Parts Order> |
| R |   <sender I.D.> 1234 <sender I.D.> |
| R |   <Order No.> 33 <Order No.> |
| R |   <Part No.> 344.1111 <Part No.> |
| R |   <Discount Code> Y <Discount Code> |
| O |   <Promo Code> Z <Promo Code> |
| R | <End Process Parts Order> |

The test case in example 2 below is exactly the same as the test message in example 1 above, except that the data in the part no. field does not match to corresponding data in the test message and the business rule in the promotion code field does not match the business rule in the test message. Note that the part order field contains data that is required and that the promotion code field contains optional business rule information.

EXAMPLE 2

Test Case

| R | <Start Process Parts Order> |
| R |   <Sender I.D.> 1234 <Sender I.D.> |
| R |   <Order No.> 33 <Order No.> |
| R |   <Part No.> 344.101 <Part No.> |
| R |   <Discount Code> Y <Discount Code> |
| O |   <Promo Code> A <Promo Code> |
| R | <End Process Parts Order> |

The test message and the test case are compared as described in step 9 of FIG. 7*b* as described above. If this comparison results in a determination that the messages are not the same, then in step 11*a* the test message validity module sends an indication of this result to the messaging module 65 of FIG. 6, which formats a message that is transmitted to a display device at a WAN portal or which is transmitted to any WAN address were it can be viewed by the integration engineer. This response message carries information that the integration engineer can use to correct problems with the design of the dealer application module. This information may be an indication that the test message that was received was not a valid test message, or as described above, the part number received in the test message was not the same as the part number in the corresponding test case and that this error is required to be corrected or that the promotion code in the test message and the test case where not that same, but that correcting this error is optional. Depending upon the exact information contained in the message, the integration engineer will be able to determine whether the problem is with the test message construction or with the dealer application module design. The process then proceeds to Step 15 of FIG. 7c. On the other hand, if the result of the comparison between the test message and the test case indicates that the test message and test case are the same, then the process proceeds to step 11b of FIG. 7c. In step 11b a determination is made whether or not the test message requires that a simulated response message be generated and returned to the DMS 11 of FIG. 1. In certain cases, the validation process requires that the DMS 11 receive a response to a previously sent test message, before the next test message can be sent. This requirement is typically associated with test messages of a type that are directed to a particular supplier, which in this case could be a particular parts supplier. This response is similar to the response that the DMS would receive had the message not been a test message, but rather a regular message. In order to provide a required response to a particular test message, the message validation module 53 of FIG. 5 includes a test message simulation module 66 as shown in FIG. 6. Provided that in step 11b, it is determined that a simulated response message is required, the process proceeds to step 13, otherwise the process proceeds to step 12 where a "test passed" message is generated and sent to the integration engineer and the process continues to step 15. In step 13, the simulation module examines the test message to determine which test case the message corresponds to and, depending up the test case, in step 14 generates a response message which is the same message as a suppliers system, such as PMS 13 of FIG. 1, would send to the DMS in response to receiving such a message. More specifically with respect to a response message generated by the simulation module 66, the supplier may have the ability to monitor and maintain the state of a dealers inventory provided the dealer sends inventory state messages to the supplier. And, as the result of tracking the dealer's state, the supplier may automatically generate messages, which in the test case are response messages, to the dealer informing them that a certain number of a particular type of part has been ordered. The following example 3 describes how a test message can be dependent upon a response received from the simulator as the result of an earlier test message.

EXAMPLE 3

The DMS 11 of FIG. 1 sends a test message to the TSS 14 indicating that there are five fan belts in stock.

After processing the test message and acknowledging its receipt, the simulator compares the stock quantify of fan belts at the DMS against a stocking policy that would have been developed based on the previous sales history, if this was not a simulation, and determines that the DMS should have eight fan belts on in stock to anticipate near term demand for the belts. The simulator generates a message that is sent by the message module indicating that three fan belts have been ordered.

The DMS receives the simulated response message and is expected to process the message and add three fan belts to the inventory.

The DMS then transmits a next test message with an indication that the three fan belts were received into stock.

After sending the required simulated response message, the process proceeds to step 15 where a determination is made whether or not another test message should be sent by the DMS. If not the validation process is complete. If, on the other hand, another message should be sent, then the process returns to step 2 of FIG. 7a.

The message validation process described above with reference to FIG. 7a, FIG. 7b and FIG. 7c may have to be repeated a number of times utilizing a particular sequence of test messages in order to be sure that the integration process was performed correctly or that the transaction information and subsequent messages generated by a DMS are completely and accurately processed by the TSS. In the preferred embodiment, the integration engineer is provided with a specific number of test messages or transactional information that is to be entered into the DMS in a preferable order to be sent to the TSS for processing. The result of each iteration of the validation process described above is stored at either the DMS, the DSS or the TSS. It is not particularly important where these results are stored. At the point that an entire sequence of test message have been validated to "pass", the TSS determines that the integration process has been completed successfully and a message is transmitted from the TSS to a portal, where they can be viewed by the integration engineer, indicating that the integration is certified as having been completed essentially correctly.

We claim:

1. In a distributed transaction management system including a first transaction processing module for initiating a transaction session and for transmitting information associated with the transaction session in the form of a message over a first communications link to a second transaction processing module that receives the message and transmits the message over a second communications link to a third transaction processing module used for processing the message, a method of validating the integration of the first transaction processing module and the third transaction processing module comprising the steps of:

entering predetermined transactional information into the first transaction processing module;

the first transaction processing module using the predetermined transaction information to create a message;

the first transaction processing module transmitting the message over a first communications link to the second transaction processing module;

the second transaction processing module receiving the message and transmitting the message over a second communications link to a third transaction processing module;

the third transaction processing module receiving the message, identifying the message as a test message and determining which of a plurality of test cases the test message corresponds to;

the third transaction processing module comparing at least one test message characteristic with at least one corresponding test case characteristic; and as the result of the third transaction processing module comparing the at least one test message characteristic with the at least one corresponding test case characteristic, the transaction processing module generating a message that contains an indication of the successful integration of the first and third transaction processing modules.

2. The method of claim 1 further comprising the third transaction processing module transmitting the message containing an indication of the successful integration of the first and third transaction processing modules to a network address.

3. The method of claim 1 wherein the first transaction processing module is comprised of an input device for receiving the predetermined transaction information, an application server for storing one or more application modules, and a communications module for formatting and transmitting the test message.

4. The method of claim 1 wherein the second transaction processing module is a router.

5. The method of claim 1 wherein the third transaction processing module is comprised of one or more communication interfaces, a transaction processing function, a message generation module, a test message validation module and a database for storing test cases.

6. The test message of claim 1 is comprised of at least one key data element and predetermined transaction information.

7. The predetermined transaction information of claim 1 is comprised of at least one of a transaction type, a transaction number, transaction specific information, a customer identification number, and a destination number.

8. The test message characteristics of claim 1 are comprised of all of the information contained in a single field of a message.

9. In a distributed transaction management system including a first transaction processing module for initiating a transaction session and for transmitting information associated with the transaction session in the form of a message over a first communications link to a second transaction processing module that receives and processes the message, a method of validating the integration of the first transaction processing module and the second transaction processing module comprising the steps of:

entering predetermined transactional information into the first transaction processing module;

the first transaction processing module using the predetermined transaction information to create a message;

the first transaction processing module transmitting the message over a first communications link to the second transaction processing module;

the second transaction processing module receiving the message, identifying the message as a test message and determining which of a plurality of test cases the test message corresponds to;

the second transaction processing module comparing at least one test message characteristic with at least one corresponding test case characteristic; and as the result of the second transaction processing module comparing the at least one test message characteristic with the at least one corresponding test case characteristic, the second transaction processing module generating a message that contains an indication of the successful integration of the first and second transaction processing modules.

10. The method of claim 9 further comprising the second transaction processing module transmitting the message containing an indication of the successful integration of the first and second transaction processing modules to a network address.

11. The method of claim 9 wherein the first transaction processing module is comprised of an input device for receiving the predetermined transaction information, an application server for storing one or more application modules, and a communications module for formatting and transmitting the test message.

12. The method of claim 9 wherein the second transaction processing module is comprised of one or more communication interfaces, a transaction processing function, a message generation module, a test message validation module and a database for storing test cases.

13. The test message of claim 9 is comprised of at least one key data element and predetermined transaction information.

14. The predetermined transaction information of claim 9 is comprised of at least one of a transaction type, a transaction number, transaction specific information, a customer identification number, and a destination number.

15. The test message characteristics of claim 9 are comprised of all of the information contained in a single field of a message.

16. In a distributed transaction management system including a first transaction processing module for initiating a transaction session and for transmitting information associated with the transaction session in the form of a message over a first communications link to a second transaction processing module that receives and processes the message, a method of validating the integration of the first transaction processing module and the second transaction processing module comprising the steps of:

entering predetermined transactional information into the first transaction processing module;

the first transaction processing module using the predetermined transaction information to create a message;

the first transaction processing module transmitting the message over a first communications link to the second transaction processing module;

the second transaction processing module receiving the message, identifying the message as a test message and determining which of a plurality of test cases the test message corresponds to;

the second transaction processing module comparing at least one test message characteristic with at least one corresponding test case characteristic;

as the result of the second transaction processing module comparing the at least one test message characteristic with the at least one corresponding test case characteristic, the second transaction processing module generating a message that contains an indication of the successful integration of the first and second transaction processing modules;

the second transaction processing module generating a simulated response message to the test message if it is determine that a response message is required; and the second transaction processing module transmitting the response message to the first transaction processing module.

* * * * *